United States Patent
Marsh et al.

(10) Patent No.: US 6,499,656 B1
(45) Date of Patent: Dec. 31, 2002

(54) IDENTIFICATION OF OBJECTS BY A READER

(75) Inventors: Michael John Camille Marsh, Johannesburg (ZA); Trevor Meredith Hodson, Randburg (ZA)

(73) Assignee: Trolley Scan (Proprietary) Limited, Johannesburg (ZA)

( * ) Notice: Subject to any disclaimer, the term of this patent is extended or adjusted under 35 U.S.C. 154(b) by 0 days.

(21) Appl. No.: 09/623,243

(22) PCT Filed: Mar. 3, 1999

(86) PCT No.: PCT/GB99/00636

§ 371 (c)(1),
(2), (4) Date: Aug. 30, 2000

(87) PCT Pub. No.: WO99/45495

PCT Pub. Date: Sep. 10, 1999

(30) Foreign Application Priority Data

Mar. 4, 1998  (GB) .............................................. 9804584

(51) Int. Cl.[7] .............................................. G07B 15/02
(52) U.S. Cl. ...................................... 235/375; 235/384
(58) Field of Search ................................. 235/384, 380, 235/375, 382, 382.5, 492, 486, 487; 705/13, 18, 28, 417

(56) References Cited

U.S. PATENT DOCUMENTS

| | | | | |
|---|---|---|---|---|
| 4,636,951 A | * | 1/1987 | Harlick | 364/412 |
| 4,691,202 A | * | 9/1987 | Denne et al. | 340/825.54 |
| 4,839,640 A | * | 6/1989 | Ozer et al. | 235/382 |
| 5,124,699 A | | 6/1992 | Tervoert et al. | |
| 5,485,520 A | * | 1/1996 | Chaum et al. | 235/384 |
| 5,537,105 A | | 7/1996 | Marsh et al. | |
| 5,686,902 A | | 11/1997 | Reis et al. | |
| 5,751,570 A | | 5/1998 | Stobbe et al. | |
| 5,822,544 A | * | 10/1998 | Chaco et al. | 395/202 |
| 5,966,083 A | | 10/1999 | March et al. | |
| 5,995,017 A | | 11/1999 | Marsh et al. | |
| 6,058,374 A | * | 5/2000 | Guthrie et al. | 705/28 |
| RE37,414 E | * | 10/2001 | Harlick | 463/42 |

FOREIGN PATENT DOCUMENTS

| | | |
|---|---|---|
| EP | 0 494 144 A2 | 1/1992 |
| EP | 0 689 151 A2 | 4/1995 |
| EP | 0 799 520 A2 | 12/1996 |

\* cited by examiner

Primary Examiner—Thien Le
(74) Attorney, Agent, or Firm—Scully, Scott, Murphy & Presser

(57) ABSTRACT

An identification system is provided for identifying a plurality of object-based transponders (14, 16, 18, 20) using an interrogator (10). The interrogator (10) includes a transmitter for transmitting an interrogation signal to the transponders, a receiver for receiving identification signals from the transponders, and processor means (21) for determining the individual and correct receipt of an identification signal. The transponders operate on the basis of backscatter modulation, and include a detector for detecting the presence of an interrupt signal from the interrogator. Control logic responsive to the detector is arranged to cease signal transmission from the transponder if the transponder completes transmission of the identification signal without receiving an interrupt signal during such transmission. The interrogator (10) is arranged to receive the identification signals from the transponders (14, 16, 18, 20) and substantially contemporaneously to determine if any identification signal has been individually and correctly received. In the event of any identification signal is being individually and correctly received, the interrogator (10), at substantially the same time, transmits a common interrupt signal for temporarily suspending signal transmission from a transponder (14) if the transponder is transmitting its identification signal at the time it receives the interrupt signal. The transponder (14) independently ceases signal transmission if it completes transmission of an identification signal without receiving an interrupt signal.

26 Claims, 4 Drawing Sheets

IDENTIFICATION OF OBJECTS BY A READER

BACKGROUND OF THE INVENTION

THIS invention relates to a method and apparatus for the identification of objects, and in particular for the identification of a plurality of remote electronic identification tags by a reader using electromagnetic communication means.

Numerous different types of electronic tags, which are typically in the form of transponders, are attached to physical objects such as goods, equipment, people, animals and the like. These tags are programmed to contain identity data, which is used to electronically identify the tagged objects via interrogation by a reader. The read data is typically arranged to be transferred to a computer system for tallying and reading the identity of those objects which are in the interrogation area of the reader.

A large number of patents already cover the situation of a reader and a plurality of transponders with the communication between the reader and the transponders being based on acoustic or electromagnetic radiation principles. In most cases, the prior art protocol requires the transponders to have a unique identification number and the ability to receive and decode a transmission containing a data stream from the reader and match it to all or components of its unique identification number.

Another class of prior art is an identification system that needs neither a unique identity nor a multi-bit receiver and decoder for the transponder, but which relies on the reader communicating with the transponder at the correct time after it has finished its transmission, if the transponder was successfully identified. The communication can be single bit in format, and the message is communicated by the timing of the communication after the completion of transmission, the communication being as simple as disturbing the energising field from the reader at the correct instant. Such a system is described in South African patent 92/0039, which requires the reader and the transponder whose identity is being determined to be synchronised and to remain synchronised after communication has been completed so that the reader may respond at the correct time after the transmission has been completed.

A further category of prior art covers an identification system that uses a selection process to isolate a single transponder so that the transponder's data can be received without being corrupted by transmissions from other transponders. U.S. Pat. No. 5,751,570 describes such a system. A collision signal is initially sent by the reader to place all transponders in to a dead state. Each transponder calculates a random dead state after receiving the collision signal, during which they do not transmit their data. At the end of the dead state each transponder will transmit its data again. If the reader receives data from only one transponder it sends an occupied or busy signal which place, all the transponders except the one busy transmitting into an idle state. The transponders in the idle state no longer transmit data. After the reader has received the complete data from the individual transponders the reader transmits an acknowledge signal which places the identified transponder into a passive or idle state in which it ceases transmission of its data. The rest of the transponders in idle state are reactivated and they recalculate a random dead time. The steps above are repeated until all the transponders have been identified. The drawback of this system is that if the electromagnetic field is changed to send the busy signal, the changes in the electromagnetic field may cause the receiver to misread the data from the transponder because the transponder signal is very much smaller than the changes in the electromagnetic field A similar system is described in U.S. Pat. No. 5,124,699, where changes in frequency are used to send signals to the transponders, Initially a frequency shift is sent to the transponders to start a selection procedure that will isolate an individual transponder. The transponders calculate a random delay after which they transmit a starting block. Due to the random delay, only a few transponders might transmit a starting block at the same time. When the reader receives a starting block it changes the transmitter frequency which causes the transponders not transmitting a starting block to go into a passive state. The remaining transponders transmit their unique code. If the reader detects that more than one transponder is transmitting its code then the reader signals an error by changing the transmitter frequency which causes these transponders to recalculate a random delay again and to follow the steps above. The transponders in the passive state remain so. This selection process will eventually yield an individual transponder. Once the reader has identified the individual transponder it is placed into a passive state by another frequency change which also causes the remaining unidentified transponders to restart the selection process again. This system requires complex tuned circuitry in the transponder so that the different frequencies can be detected

SUMMARY OF THE INVENTION

According to a first aspect of the invention there is provided a method of identifying objects by an interrogator, comprising the steps of:

transmitting an interrogation signal from the interrogator to the objects;

transmitting from each object to the interrogator an identification signal having predetermined indicator characteristics in response to the interrogation signal;

receiving the identification signals from the objects at the interrogator and substantially contemporaneously determining at the reader if any identification signal has been individually and correctly received on the basis of the indicator characteristics;

substantially contemporaneously transmitting from the interrogator a common re-transmit or interrupt signal in the event of any identification signal not being individually and correctly received; and ceasing signal transmission from an object if that object completes its signal transmission without receiving an interrupt signal front the interrogator during such transmission.

Preferably, the method includes the step of temporarily suspending signal transmission from an object if that object is transmitting its identification signal at the time it receives the interrupt signal from the interrogator.

In a preferred form of the invention, the method comprises the further steps of continuing so to receive all identification signals at the interrogator, and to transmit the interrupt signals, until no further identification signal is individually and correctly received for a time period sufficient to ensure that all identification signals from objects have been individually and correctly received by the interrogator.

In one form of the invention, the method may comprise the steps of continuously transmitting the interrogation signal and transmitting the interrupt signals at a time interval which defaults to less than the average transmission time of a valid identification signal in the absence of the receipt of an identification signal at the interrogator.

Conveniently, the method includes the step of transmitting at random time intervals an identification signal from each object which has not ceased its signal transmission and allowing each object which has ceased its transmission to recommence transmission in response to a reset event.

The reset event may include the absence of or variation in the interrogation signal for a predetermined minimum time period.

Advantageously, the method further includes the steps of transmitting a disable signal from the interrogator, receiving the disable signal at at least one of the objects, and setting a memory element in the object preventing it, only after the object has ceased signal transmission, from responding to any subsequent interrogation signal for a minimum predetermined stand-off time period.

The method may include the still further steps of transmitting an enable signal from the interrogator, receiving the enable signal at at least one of the objects, and resetting the memory element in the object to enable the object and allow it to respond to the same or subsequent interrogation signal in the manner described above.

Advantageously, the enable and disable signals are at least initially transmitted prior to the possible transmission from any object of an identification signal, and the enable and disable signals also serve as interrupt signals Typically, the predetermined indicator characteristics of the identification signals are identical in form and have a predetermined duty cycle, and include a fixed length data stream preceded by an initial header and including a data component and a checksum component, with the transmission of a signal from an object commencing with the same header, and the interrogator being arranged to accept the start of an identification signal only if there has been no received transmission immediately prior to the receipt of such header.

The indicator characteristics may further include the transmission of the identification signal in a Manchester form modified to combine transmission clock rate and the data stream to produce a 50% duty cycle at a minimum operational bandwidth.

The invention extends to an identification system comprising an interrogator and a plurality of object-based responders, the interrogator including transmitter means for transmitting an interrogation signal to the responders, receiver means for receiving identification signals from the responders, and processor means for determining the individual and correct receipt of an identification signal, each responder comprising a receiver for receiving the interrogation signal, generator means for generating the identification signal, a transmitter for transmitting the identification signal back to the interrogator, a detector for detecting the presence of an interrupt signal from the interrogator, and control means responsive to the detector and being arranged to cease signal transmission from the responder if the responder completes transmission of the identification signal without receiving an interrupt signal during such. transmission.

Preferably, the control means is arranged temporarily to suspend transmission of an identification signal from the responder if the responder is transmitting its identification signal at the time it receives the interrupt signal.

Advantageously, the generator means comprises a first memory means for storing identification data, an oscillator, a Manchester encoder for deriving encoded identification data from the identification data and the oscillator, and a modulator driven by the Manchester encoder to derive an identification signal, and the transmitter and receiver comprise an antenna coupled to an RF module for performing backscatter modulation of the identification signal.

Typically, the interrogator is arranged to continue receiving identification signals, and transmitting the interrupt signal, until no further identification signal is individually and correctly received for a time period sufficient to ensure that all identification signals have individually and correctly been received by the interrogator.

The identification system may include processor means for generating the interrupt signals and for generating enable and disable signals for respectively enabling and disabling the responders, and each of the responders include second memory means arranged to be set by a disable signal for preventing the responder from responding to any subsequent interrogation signal from the interrogator for a minimum predetermined time period, only after it has ceased signal transmission, and to be reset by all enable signal for allowing the responder to respond immediately to an interrogation signal.

According to a further aspect of the invention there is provided a responder for an identification system of the type comprising an interrogator and a plurality of responders, each responder comprising a receiver for receiving an interrogation signal, first memory means for storing identification data, an oscillator a modulator for deriving a modulated identification signal from the identification data and the oscillator, and a transmitter for transmitting the identification signal back to the interrogator, the responder further comprising a detector for detecting the presence of an interrupt signal from the interrogator, and signal ceasing means arranged to cease signal transmission from the responder if the responder completes transmission of the identification signal without receiving an interrupt signal from the interrogator during such transmission.

The responder advantageously includes signal suspending means responsive to the detector and being arranged temporarily to suspend transmission of an identification signal from the responder if the responder is transmitting its identification signal at the time it receives the interrupt signal.

Typically, the signal suspending means and the signal ceasing means are incorporated in control logic circuitry, the responder further including a random timer connected to the control logic circuitry for enabling identification signals to be repeatedly re-transmitted at varying random time intervals from the responder until such time as it has completed the transmission of an identification signal without being interrupted by an interrupt signal.

Conveniently, the responder includes second memory means arranged to be set by a disable signal for preventing the responder, only after the responder has ceased signal transmission, from responding to any subsequent interrogation signal for a minimum predetermined time period.

The second memory means may be arranged to be reset by an enable signal for allowing the responder to respond to a subsequent interrogation signal after the responder has ceased signal transmission.

Typically, the second memory means comprises a register responsive to disable signals and a memory module responsive both to the register and to the signal ceasing means for allowing the responder to complete the transmission of an identification signal prior to being disabled.

Advantageously, the responder further includes a Manchester encoder for deriving encoded identification data from the identification data and the oscillator, for receipt at the modulator, and the transmitter and receiver comprise an antenna coupled to an RF module for performing backscatter modulation in response to an interrogation signal, the Manchester encoder being responsive to an output enable signal signifying completion of the transmission of the identification signal.

According to a still further aspect of the invention there is provided an interrogator for an identification system of the type comprising an interrogator and a plurality of responders, the interrogator including transmitter means for transmitting an interrogation signal to the responders, receiver means for receiving identification signals from the responders in response to the interrogation signal, first processor means for substantially contemporaneously determining the individual and correct receipt of an identification signal, signal generator means responsive to the processor means for generating substantially contemporaneously an interrupt signal in the event of any identification signal not being individually and correctly received from any one or more objects, and for causing the interrupt signal to be transmitted sufficiently quickly to suspend signal transmission from any such object whilst it was not individually and correctly transmitting its identification signal.

Preferably, the first processor means is arranged to continue receiving and processing all identification signals, and the signal generator means is arranged to continue generating interrupt signals, until no further identification signal is individually and correctly received, for a time period sufficient to ensure that all identification signals from objects have been individually and correctly received.

Typically, the transmitter is arranged to transmit the interrogation signal continuously, and the signal generator means is arranged to transmit the interrupt signal at a time period which defaults to less than the average receipt time of a valid identification signal in the absence of the receipt of an identification signal at the interrogator.

Conveniently, the signal generator means is arranged to generate enable and disable signals for transmission via the transmitter, the disable signal being arranged to set memory elements in the objects preventing them, only once they have ceased signal transmission, from responding to any subsequent interrogation signal for a minimum predetermined stand-off time period, and the enable signal being arranged to reset the memory elements to allow the objects to respond to a subsequent interrogation signal.

The receiver may include a receiving antenna and a quadrature receiver, and the first processor means may include a signal processor for processing baseband components of the identification signal derived from the quadrature receiver into a reconstructed Manchester data signal, and an error checking microprocessor for decoding and error checking the Manchester signal at least on the basis of duty cycle, clock rate, data stream length and checksum calculations.

DESCRIPTION OF EMBODIMENTS

Figure 1:
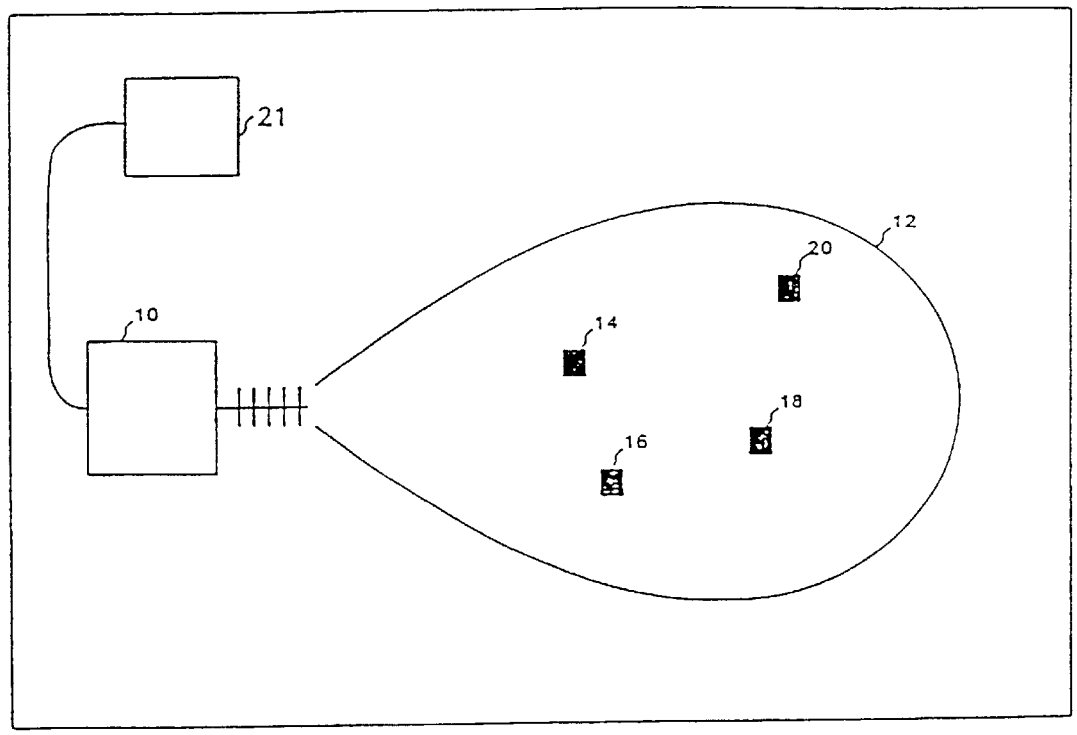
FIG. 1 shows a reader and four transponders of the invention in the electromagnetic field of the reader.

In FIG. 1 a reader or interrogator 10 is shown which transmits an electromagnetic energising field depicted by an oval footprint 12. The oval footprint 12 represents the effective reading range of the reader, which is typically between 4 to 6 meters. Four transponders 14, 16, 18 and 20 are within the field. Any transponder within the footprint 12 will derive sufficient energy from the energising field so as to power its circuitry. In this situation where the transponders are using energy from an energising field to power up their electronic circuitry, and due to the fact that the field needed for energising is typically much stronger than the field strength needed for communication using the backscatter modulation method, it can be accepted that all transponders that are being energised by a reader will have quality communications with the reader and that their reflected backscatter signal will be received by the reader. When leaving the zone, the transponders lose energy and stop operating before their communication signals degrade to such a level that the reader is no longer able to receive all the backscatter signals correctly.

Initially the energising field is off. The mode of operation is set by a computer 21 connected to the reader. The modes of operation are "normal read" with no electronic article surveillance (EAS) after the transponders are successfully identified, "set EAS on" to disable each transponder once it has been successfully identified, and "clear EAS" to enable each transponder before reading. Electronic article surveillance is commonly used as an anti-shoplifting and anti-"shrinkage" measure. The energising field is turned on, the transponders are identified and then it is turned off again.

Figure 2:
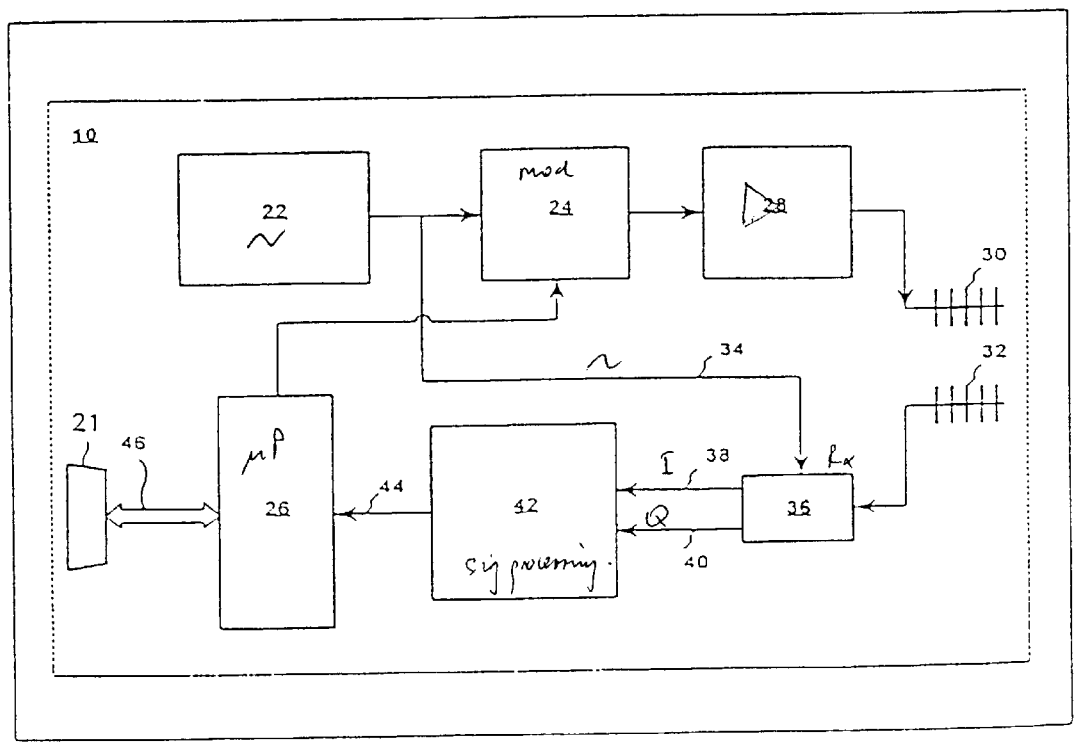
FIG. 2 shows a schematic block diagram of the reader of the invention.

FIG. 2 shows a schematic block diagram of reader 10 An oscillator 22 provides a carrier wave signal at a typical operating frequency of 915 MHz. A modulator 24 is controlled by a microprocessor 26. This allows the microprocessor 26 to send signals to the transponders by modulating the carrier wave signal. The signals are sent by the microprocessor 26 switching the modulator 24 to 100% modulation depth for a short period (100 $\mu$sec) which has the effect of sending a negative going pulse to the transponders. Another method might be to transmit an independent signal on another frequency, to increase the power level of the energising field, or to transmit the energising field briefly with another polarisation.

The different types of interrupt signals sent to the transponders are a "normal interrupt" signal consisting of a single pulse, a "set BAS interrupt" signal consisting of two pulses and an "FAS clear" signal consisting of five pulses, and which must be sent within 16 ms after the energising field has been turned The interrupt signals are communicated by some means to all of the transponders, regardless of whether or not they are transmitting at that instant These signals are interpreted as the failed transmission signal for those transponders that are currently in a transmission state. The interrupt signal is transmitted at the instant that the reader detects a corrupted transmission state, and it is not necessarily in synchronism with any data clock in any transponder.

A power amplifier 28 boosts the modulated carrier wave signal to sufficient levels to give the effective reading range 12. A transmit antenna 30 radiates the carrier wave signal to give the energising field, and the transponders 14, 16, 18 and 20 derive power from the energising field and transmit their codes by means of backscatter modulation.

A receive antenna 32 receives the reflected backscatter modulation signals from the transponders. The received backscatter modulation signals are mixed with the local oscillator signal 34 in a quadrature receiver 36. A local oscillator signal 34 is derived from the oscillator 22. The output of the quadrature receiver 36 is a baseband I signal 38 and a baseband Q signal 40 which represents the transponder data. The I signal 38 and Q signal 40 are fed into a signal processing module 42. The signal processing module 42 amplifies the signals, and combines them together to give a reconstructed Manchester data signal 44 which represents the Manchester data sent by the transponders. The combining of the I signal 38 and the Q signal 40 allow the transponder code to be detected irrespective of the path length between the reader 10 and the transponders 14 to 20.

The reconstructed Manchester data signal 44 is input into the microprocessor 26 for decoding and error checking. The transponder data is encoded in a modified Manchester form whereby the transponder's clock rate, typically 10 kHz, and the serial data are combined to give a data stream having a 50% duty cycle at minimum operational bandwidth. From this data stream it is possible for the microprocessor 26 to extract the data and the clock rate of the transponder.

Figure 5:
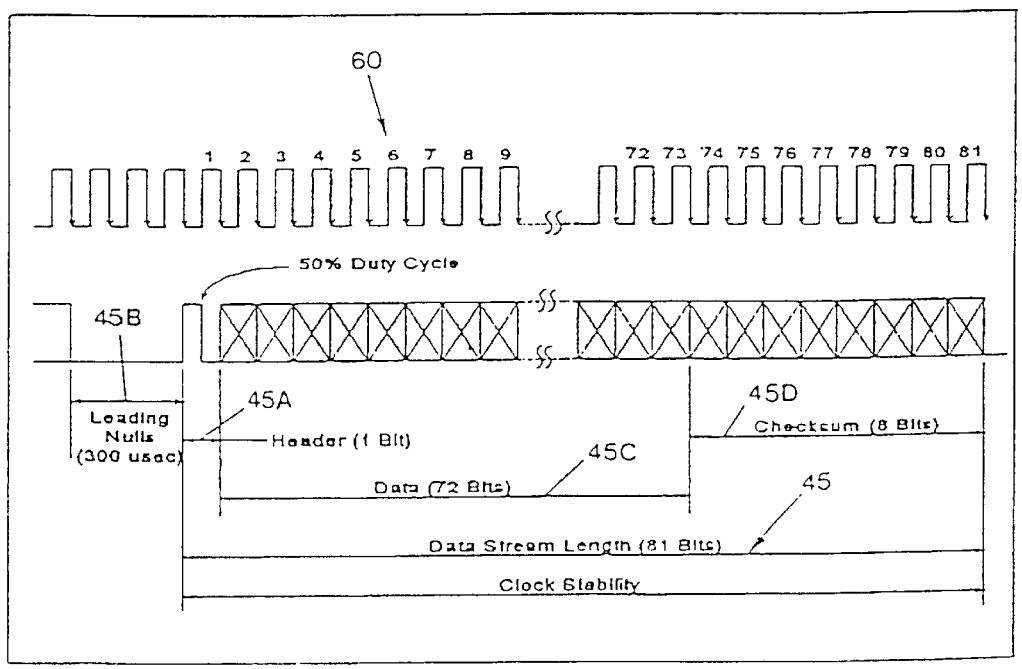
FIG. 5 shows a schematic diagram of a typical successfully transmitted identification signal.

The microprocessor 26 performs error checking to determine first, if there is more than one transponder transmitting at the same time and second, if only one transponder is transmitting, if there are errors in the received transponder data. In both cases the transponders or transponder respectively are sent an interrupt signal if an error is encountered by the microprocessor 26 so that the transponders can retransmit their data again. The clock rate of the transponders is typically 10 kHz with a tolerance of 20% i.e. the clock rate of a transponder can vary from 8 kHz to 12 kHz. The microprocessor 26 checks that the clock rate of the transponder is between these two predetermined limits, failing which an interrupt signal is transmitted. The Manchester encoded data stream, which is shown at 45 in FIG. 5, is a fixed length data stream, which in this embodiment it is 81 bits. Any lengthening of the code means that more than one transponder is communicating at the same time and that the reader is detecting a corrupted signal.

The microprocessor 26 checks the length of the data stream and if more than 8) bits are received, then an interrupt signal is transmitted. All transponder transmissions will start with the same 1 bit header 45A at the front of the Manchester data. The microprocessor 26 requires that no transmissions are received immediately before the header transmission to clearly define the start of transmission, which is signalled by 3 clock periods 45B of 10 kHz i.e. 300 μsec. if there are transmissions with in this period then an interrupt signal is transmitted. After the header 45A, the transponder data is in the form of a 72 bit string 45C followed by a checksum or parity component 45D allowing the microprocessor 26 to verify the correctness of the data received by verifying that the parity or checksum calculations provide the correct answer and that the data has not been contaminated by a simultaneous transmission by a second transponder having the same start time and the same transponder clock rate. If the checksum or parity calculations provide an incorrect answer then an interrupt signal is transmitted. During transmission the clock rate of any transponder will be stable and the microprocessor will be able to monitor this stability as transferred in the data stream, and determine as soon as there is any sudden change in the clock rate in the data stream such as might occur when another transponder starts its simultaneous transmission. The microprocessor monitors the clock rate of the data stream and any sudden change in the received clock rate will cause an interrupt signal to be transmitted. If the data stream passes all the above tests then the microprocessor 26 has decoded valid transponder data from a single transponder. This data is sent to the computer 21 via a communication link 46 to he processed further. In this embodiment, the communication link is a RS232 serial link. This could also be a parallel link or a network link.

The incorporation of a unique identity number in the transponder data is not one of the required properties to successfully receive data from the transponders. The system will operate when many transponders have identical numbers, in which case it will be able to count how many instances of such numbers were encountered.

Figure 3:
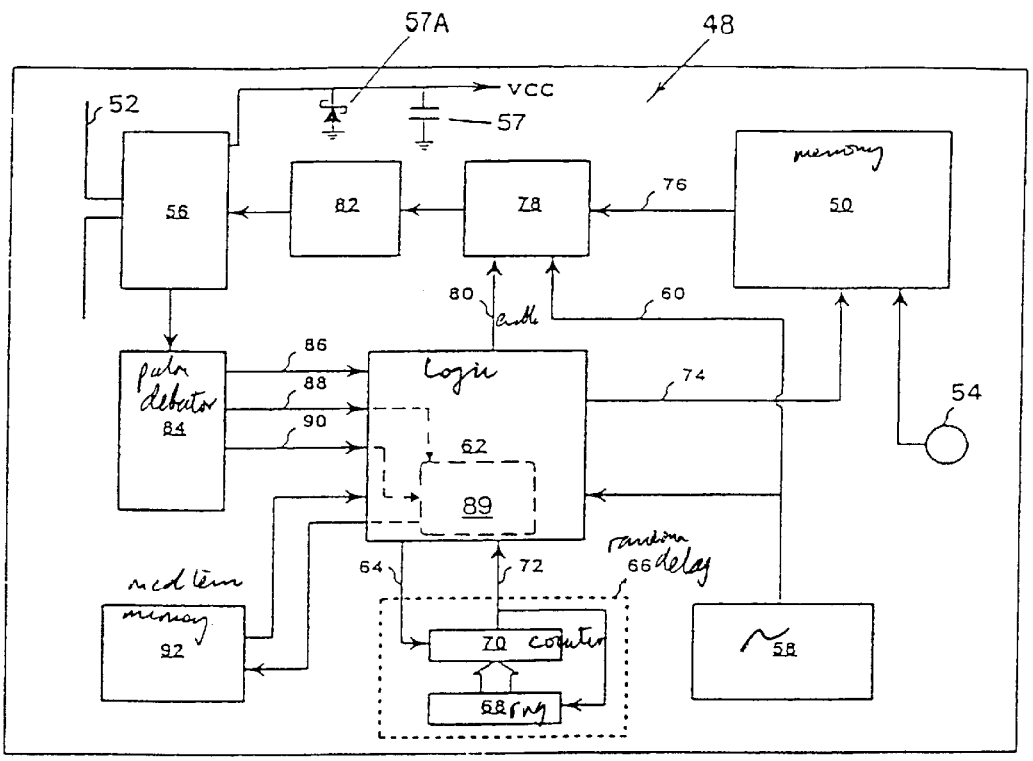
FIG. 3 shows a schematic block diagram of a transponder of the invention.

FIG. 3 shows a schematic block diagram of a transponder 48. The transponder data or code is stored in a data memory module 50. in this embodiment the transponder data consists of 80 bits and a leading 1 bit header. The data memory is preferably PROM memory, but EPROM or EEPROM memory may also be used. It is preferably programmed when the transponder is applied to the object it is tagging. The programming is performed by a programmer which has two direct contact pins on an antenna 52 to provide power and a third direct contact pin onto a programming pad 54 for the transponder data.

The antenna 52 collects energy from the energising field 12. The antenna is a wire dipole antenna. A foil patch antenna may also be used. A radio frequency (RF) module 56 rectifies the collected energy and charges an energy store in the form of a capacitor 57 to provide the operating voltage for the transponder circuitry. A small battery can also be used to power the transponder. The closer the transponder is to the reader, the stronger the energising field and the greater the collected energy. The RF module 56 also has overvoltage protection in the form of a zener diode-type component 57A to limit the operating voltage when the transponder is close to the reader. When the energising field is turned on, the transponder circuitry powers up. An oscillator 58 provides an imprecise but stable clock signal 60 for the transponder circuitry in the range of 8 kHz to 12 kHz, typically 10 kHz.

A control logic unit 62 divides the clock by eighty one to provide a frame clock signal 64. A frame is defined as the number of clock cycles to transmit the entire transponder data of 81 bits, so the frame clock occurs every 81 clock cycles or 8.1 ms for a 10 kHz oscillator. The frame clock signal 64 is used to clock a random delay timer 66 The random delay timer consists of a pseudorandom number generator 68 and a counter 70. On power up of the transponder, the counter 70 is always loaded with the number two so that the transponder will always transmit its data in the third frame after power up so that if it is the only transponder present it can quickly be identified. The counter 70 counts down and when it reaches 0 it generates a trigger signal 72. The trigger signal 72 causes the pseudo-random generator 68 to calculate a new random number which is then loaded into the counter 70 to time the next random delay period The trigger signal 72 also causes the transponder to start transmission of its data which occurs in the following manner. The control logic unit 62 sends a shin clock signal 74 to the data memory module 50 which serially shifts data 76, starting with the start bit, out of the data memory module 50. The data 76 is exclusive or'ed with the clock 60 in a Manchester encoder 78. The control logic also enables the output of the Manchester encoder 78 by means of an output enable signal 80 The output of the Manchester encoder 78 drives a modulator 82. The modulator 82 varies the loading on the antenna and so modulates the backscatter from the antenna with Manchester encoded transponder data. On the next frame clock signal 64 the transmission of the data is terminated and the output of the Manchester encoder 78 is disabled by means of the output enable signal 80.

When the reader 10 sends a signal to the transponder it momentarily removes the RF energy i.e. it pulses the RF energy off and then back on again. A pulse detector 84 continuously monitors the incoming RF energy on the antenna 52 for pulses from the reader 10. The number of pulses are counted. If a single pulse is received then a "normal interrupt" signal 86 is pulsed. If a double pulse is received then the "set EAS interrupt" signal 88 is pulsed into a memory device in the form of a set EAS register 89. If five pulses are received then an "EAS clear" signal 90 is pulsed to clear the register 89. The "EAS clear" signal is only monitored during the first two frames after power on, after which it is ignored.

When any pulse is received from the reader i.e. if either of the interrupt signals 86 or 88 is pulsed whilst the transponder is busy transmitting its data, then the output of the Manchester encoder 78 is immediately disabled by means of the output enable signal 80. This immediately stops the modulation of the antenna and so stops the backscatter modulation. If, however, the transponder is able to transmit its entire data without receiving a pulse or pulses from the reader 10, then the transponder "knows" it has been successfully identified by the reader 10. The control logic 62 places the transponder into a passive state in which it ceases any further transmission of data until it has been reset by having the energising field removed. Another method of resetting the transponder might be a tone modulated on the carrier.

If "set EAS interrupt" signals 88 are received prior to the transponder successfully transmitting its data, then a set EAS register 89 in the control logic Unit 62 is set so as to remember that the EAS mode must be enabled when the transponder successfully transmits its data. Thus, when the transponder does successfully transmit its data and the set BAS register is set, then an EAS memory module 92 is set and so the transponder is placed in EAS mode. The PAS memory module 92 keeps its state even if power is removed from the transponder If the EAS memory 92 is set then the transponder is disabled from transmitting its data. A set EAS interrupt signal has to be received by the transponder prior to the transponder transmitting its identification signal for the first time so that the set EAS register can be set prior to the first transmission, thereby ensuring that in the event of only one transponder being located in the footprint of the interrogator, the identification signal from this transponder is picked up. More particularly, should the identification signal from a single transponder be successfully transmitted without generating an interrupt signal, the set EAS register would not be activated. As a result a "dummy" interrupt signal is initially sent to ensure that the set EAS register is activated regardless, as is shown by interrupt signal 88A in FIG. 4.

The BAS memory module 92 is a medium term memory element with a typical time constant of several hours, which operates to block any backscatter modulation transmissions as long as the memory is set. This memory element has leakage and will reset after its charge has leaked away, which is typically from four to eight hours, depending on ambient temperature. This operation functions whether or not the transponder has power from its presence in an energising, field. If an BAS clear signal 90 is received during the first two frames after power up, then the contents of the EAS memory module 92 is cleared whether it is set or not and so the transponder is re-enabled to transmit its data again.

Figure 4:
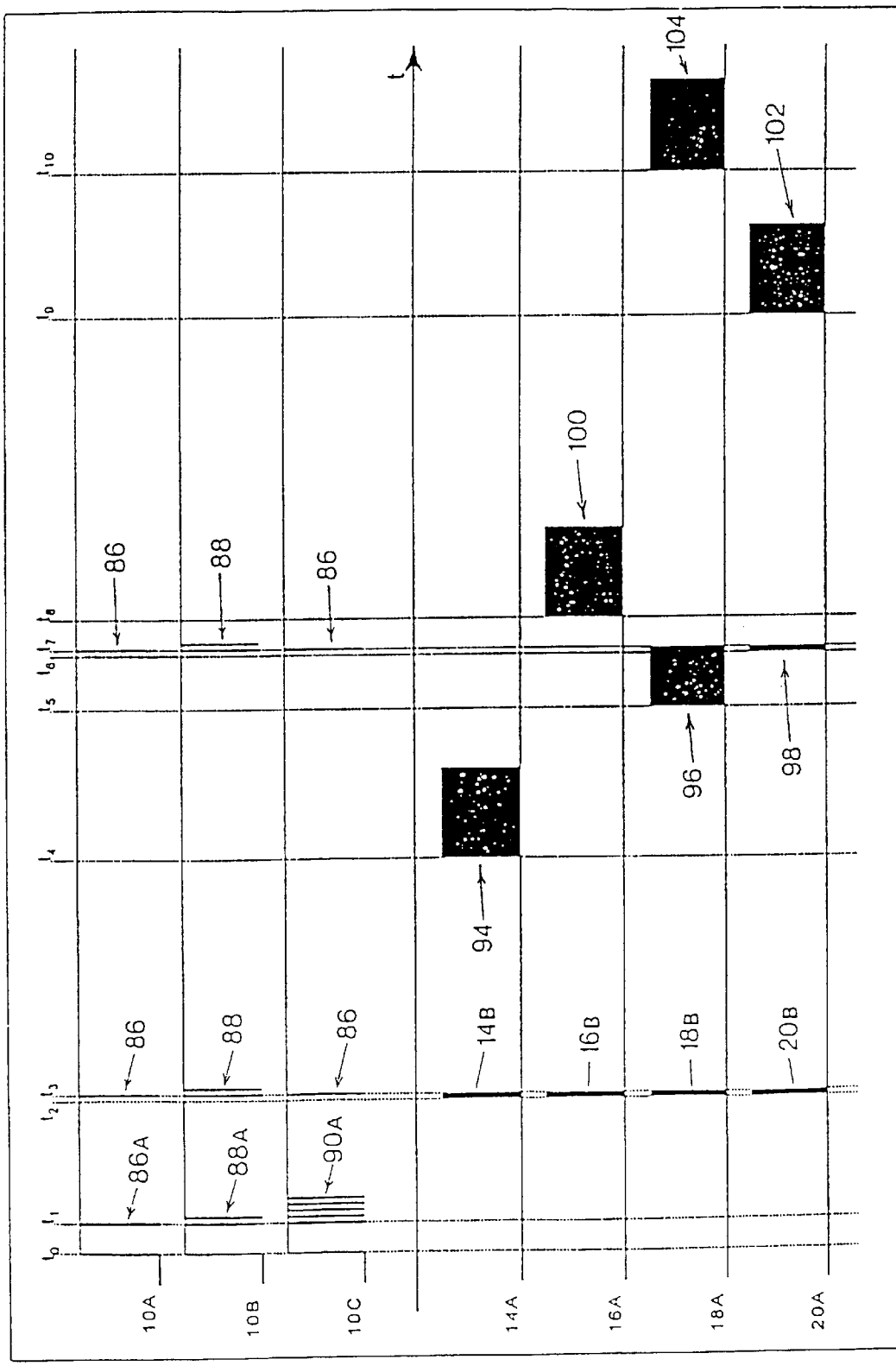
FIG. 4 shows a series of signal waveforms illustrating the communication protocols between the reader and transponders.

FIG. 4 shows signal waveform interaction between the reader 10 and the transponders 14 to 18. Waveforms 10A, 10B and 10C show the energising field of the reader 10 for three different scenarios. Waveform 10A is for the scenario when "normal interrupt" signals are used, waveform 10B is for the scenario when "set EAS interrupt" signals are used and waveform 10C is for the scenario when an "EAS clear" signal is initially sent to clear the EAS memory modules 92, followed by "normal interrupt" signals. Waveforms 14A, 16A, 18A and 20A are the Manchester encoder 78 outputs i.e. the modulation of the antennae 52 of the respective transponders 14, 16, 18 and 20.

At time $t_0$ the reader 10 turns on the energising field 12. The transponders are powered up and perform a reset. At time $t_1$, typically 4 ms, the reader sends an initial interrupt signal prior to the transponder's first transmission. For waveform 10A a normal interrupt signal 86A is sent which has no effect on the transponders. For waveform 10B a "set EAS" signal 88A is sent which causes the set EAS signal 88 in the transponders to be pulsed and the set EAS register in the control logic 62 to be set. For waveform 10C an "BAS clear" signal 90A is sent which causes the EAS clear signal 90 in the transponders to be pulsed and the control logic 62 to clear the EAS memory 92, thus allowing the transponders to transmit data again.

At time $t_2$, typically 16 ms, all the transponders have waited two frames after power up and they start transmitting their respective data. The random delay timers 66 in the transponders are seeded with new random delays. The reader 10 receives the backscatter modulation 14B to 20B from the transponders and attempts to rebuild the Manchester data. As there is more than one transponder 14 to 20 transmitting, the microprocessor 26 will detect an error in the reconstructed Manchester data and so at time $t_3$ sends an interrupt signal by modulating the energising field. The transponders' pulse detectors 84 detect the pulse/s on the energising field and pulse the relevant signal. In the case of waveform 10A and 10C the normal interrupt signal 86 is pulsed and in the case of waveform 1013, the "set EAS" signal 88 is pulsed. The control logic 62 immediately disables the output of the Manchester encoder 78 and so data transmission from the transponders ceases. The transponders then wait their respective delay times.

At time $t_4$ the random delay timer 66 of transponder 14 generates the trigger signal 72 which causes transponder 14 to start transmitting its data 94. The reader 10 receives the backscatter modulation 94 and attempts to rebuild the Manchester data. The microprocessor 26 decodes the Manchester data while checking it for errors. As there is only a single transponder transmitting, the data will contain no errors and so the microprocessor does not send an interrupt signal. Once transponder 14 has finished transmitting its data and no pulses were received by the transponder, the control logic 62 of transponder 14 places transponder 14 into a passive state and it ceases any further transmissions for the duration of the interrogation signal. The microprocessor 26 sends the successfully received transponder data to the computer 21 via the communication link 46.

At time $t_5$ the random delay timer 66 of transponder 18 generates a trigger signal 72 which causes transponder 18 to stat transmitting its data 96. The reader 10 receives the backscatter modulation and attempts to rebuild the Manchester data. The microprocessor 26 decodes the Manchester data, whilst checking it for errors. At time $t_6$ the random delay timer 66 of transponder 20 also generates a trigger signal 72 which causes transponder 20 also to start transmitting its data 98. The microprocessor 26 detects an error in the reconstructed Manchester data and so at time $t_7$ sends interrupt signals 86 or 88 by modulating the energising field. The transponders' pulse detectors 84 detect the pulses on the energising field and the relevant interrupt signal 86 or 88 is pulsed. The control logic units 62 of transponders 18 and 20 immediately disable the output of the Manchester encoder 78 of the transponders 18 and 20 and so data transmission from the transponders 18 and 20 ceases. Transponders 18 and 20 then wait their respective delay times determined by their reset random delay timers 66.

At times $t_8$, $t_9$ and $t_{10}$, transponders 16, 20 and 18 respectively transmit their respective data 100, 102 and 104 without interruption and so are successfully received by the reader 10 and sent to the computer 21. Transponders 16, 18 and 20 are placed into a passive state and cease further transmissions. Once the receiver 36 has not received any further transmissions for a period equal to the longest random delay timer of the transponders (in this case 2 seconds) it indicates to the computer 21 that all transponders are read and shuts down the energising field 12.

Figure 6:
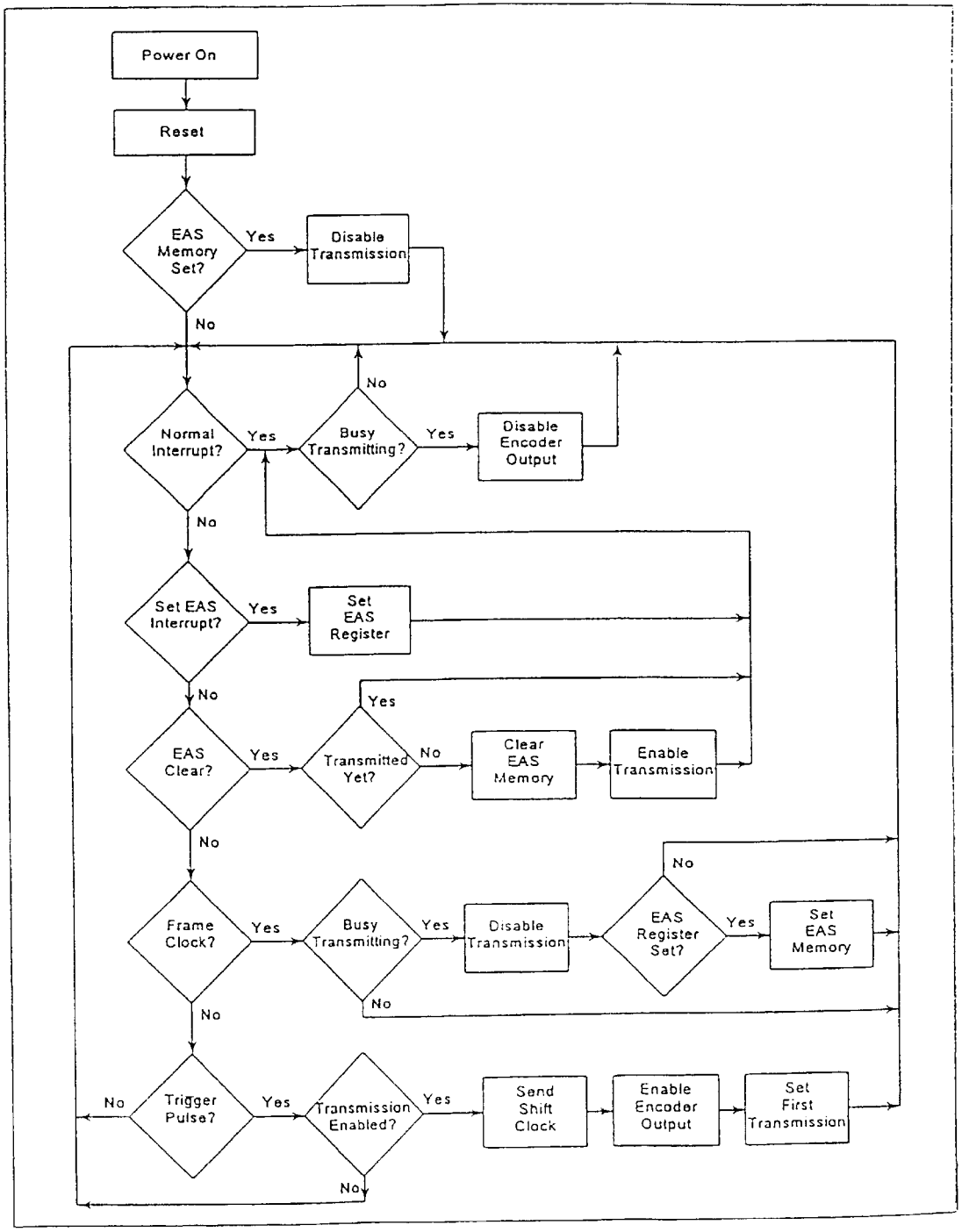
FIG. 6 shows a flowchart illustrative of the operation of the control logic of the transponder

Referring now to FIG. 6, a self-explanatory flowchart indicating the operation of a control logic unit 62 is shown. In particular, the flowchart is illustrative of the manner in which the various EAS modes operate.

For modelling purposes, for transponders with a 10 kHz clock rate, and a 128 transmission frame time maximum random period, for 400 transponders to be read, more than 30000 clashes (or interrupts) would occur in reading the transponders.

Should a reader be in the process of radiating an energising field and for some reason does not want to accept further identities, say while waiting for the computer backlog to clear, the reader can generate interrupt signals at a period less than the message transmission time for the fastest allowable transponder clock and thereby prevent the transponders not already in passive mode from going into passive mode until the blockage has been cleared.

The above embodiment is suited to applications where a number of transponders are placed with in the reading range of a reader, the energising field is turned on, the transponders are read and the energising field is turned off again. In situations where a reader is mounted, say, on a door frame for access control or above a conveyor belt, the energising field would be permanently on and the transponders would be moved into the energising field, they would power up, transmit their data and then move out of the energising field again. In these situations the reader would continuously transmit interrupt signals at an interval less than the message transmission time for the fastest allowable transponder clock, typically 5 ms. The reader stops sending interrupt pulses only when it starts to receive uncorrupted transmission data from a particular transponder and continues to suspend transmission of such interrupt pulses for as long the data remains uncorrupted until the transponder successfully finishes its transmission. Thereafter, it continues to send interrupt signals at 5 ms intervals until it starts to receive uncorrupted transmission data from another transponder. In this manner transponders can be moved passed a permanently powered reader, which will be able to read them and still be able to process multiple transponders. Also, since the transponder only transmits after a period of 2 frames (typically 16 ms) then the transponder would receive at least two interrupts of the "sct EAS interrupt" type, if EAS mode is required, prior to its first transmission, thus fulfilling the requirement for the enabling of EAS.

What is claimed is:

1. A method of identifying objects by an interrogator, comprising the steps of:

transmitting an interrogation signal from the interrogator to the object;

transmitting from each object to the interrogator an identification signal having predetermined indicator characteristics in response to the interrogation signal;

receiving the identification signal from the object at the interrogator and substantially contemporaneously determining at the interrogator whether any identification signal has been individually and correctly received or not on the basic of the indicator characteristics;

substantially contemporaneously transmitting from the interrogator a common re-transmit or interrupt signal to the objects in the event of the interrogator detecting a corrupted transmission state arising from any identification signal not being individually and correctly received; and independently ceasing signal transmission from an object if that object successfully completes its signal transmission without receiving an interrupt signal from the interrogator during such transmission.

2. A method according to claim 1 which includes the step of temporarily suspending signal transmission from an object if that object is transmitting its identification signal at the time it receives the interrupt signal from the interrogator.

3. A method according to claim 1 which comprises the further steps of continuing so to receive all identification signals at the interrogator, and to generate the interrupt signals in response to a corrupted transmission state, until no further identification signal is individually and correctly received for a time period sufficient to ensure that all identification signals from objects have been individually and correctly received by the interrogator, the time period being at least as long as a maximum random inter-transmission delay time period of any one of the objects.

4. A method according to claim 1 which comprises the steps in an alternative mode of operation of continuously transmitting the interrogation signal and transmitting the interrupt signals at a time interval which defaults to less than the average transmission time of a valid identification signal in the absence of the receipt of an identification signal at the interrogator.

5. A method according to claim 1 which includes the step of transmitting at random time intervals an identification signal from each object which has not ceased its signal transmission and allowing each object which has ceased its transmission to recommence transmission in response to a reset event.

6. A method according to claim 5 in which the reset event includes the absence of or variation in the interrogation signal for a predetermined minimum time period.

7. A method according to claim 1 which includes the steps of transmitting a disable signal from the interrogator, receiving the disable signal at at least one of the objects, and setting a memory element in the object preventing it, only after the object has ceased signal transmission, from responding to any subsequent interrogation signal for a minimum predetermined stand-off time period.

8. A method according to claim 7 which includes the steps of transmitting an enable signal from the interrogator, receiving the enable signal at at least one of the objects, and resetting the memory element in the object to enable the object and allow it to respond to a subsequent interrogation signal in the manner described in claim 1.

9. A method according to claim 8 in which the enable and disable signals are at least initially transmitted prior to the possible transmission from any object of an identification signal, and in which the enable and disable signals also serve as interrupt signals.

10. A method according to claim 1 in which the predetermined indicator characteristics of the identification signals are identical in form and have a predetermined duty cycle, and include a fixed length data stream preceded by an initial header and including a data component and a checksum component, with the transmission of a signal from an object commencing with the same header, and the interrogator being arranged to accept the start of an identification signal only if there has been no received transmission immediately prior to the receipt of such header.

11. A method according to claim 10 in which the indicator characteristics further include the transmission of the identification signal in a Manchester form modified to combine transmission clock rate and the data stream to produce a 50% duty cycle at a minimum operational bandwidth.

12. An identification system comprising an interrogator and a plurality of object-based responders, the interrogator including transmitter means for transmitting an interrogation signal to the responders, receiver means for receiving identification signals from the responders in response to the interrogation signal, processor means for determining whether an identification signal is individually and correctly received or not and for generating an interrupt signal in the event of a failed transmission being received from any one or more of the responders, each responder comprising a receiver for receiving the interrogation signal, identification signal generator means for generating the identification signal, a transmitter for repeatedly transmitting the identification signal back to the interrogator, a detector for detecting the presence of an interrupt signal from the interrogator, and control means responsive to the detector and being arranged independently to tease signal transmission from the responder if the responder completes transmission of the identification signal without receiving an interrupt signal during such transmission.

13. An identification system according to claim 12 in which the control means is arranged temporarily to suspend transmission of an identification signal from the responder if the responder is transmitting its identification signal at the time it receives the interrupt signal.

14. An identification system according to claim 12 in which the interrogator is arranged to continue receiving identification signals, and to continue transmitting the interrupt signal in response to a failed transmission signal, until no further identification signal is individually and correctly received for a time period sufficient to ensure that all identification signals have individually and correctly been received by the interrogator, the time period being at least as long as a maximum random inter-transmission time period of any one of the responders.

15. An identification system according to claim 12 in which the interrogator processor means is further arranged to generate enable and disable signals for respectively enabling and disabling the responders, and each of the responders include first memory means for storing identification data, second memory means arranged to be set by a disable signal for preventing the responder from responding to any subsequent interrogation signal from the interrogator for a minimum predetermined time period, only after it has ceased signal transmission, and to be reset by an enable signal for allowing the responder to respond immediately to an interrogation signal.

16. A responder for an identification system of the type comprising an interrogator and a plurality of responders, each responder comprising a receiver for receiving an interrogation signal, first memory means for storing identification data, an oscillator, a modulator for deriving a modulated identification signal from the identification data and the oscillator, and a transmitter for repeatedly transmitting the identification signal back to the interrogator, the responder further comprising a detector for detecting the presence of an interrupt signal from the interrogator, signal ceasing means arranged independently to cease signal transmission from the responder if the responder completes transmission of the identification signal without receiving an interrupt signal from the interrogator during such transmission, and signal suspending means responsive to the detector and being arranged temporarily to suspend transmission of an identification signal from the responder if the responder is transmitting its identification signal at the time it receives the interrupt signal.

17. A responder according to claim 16 in which the signal suspending means and the signal ceasing means are incorporated in control logic circuitry, the responder further including a random timer connected to the control logic circuitry for enabling identification signals to be repeatedly re-transmitted at varying random time intervals from the responder until such time as it has completed the successful transmission of an identification signal without being interrupted by an interrupt signal.

18. A responder according to claim 16 which includes second memory means arranged to be set by a disable signal for preventing the responder, only after the responder has ceased signal transmission, from responding to any subsequent interrogation signal for a minimum predetermined time period.

19. A responder according to claim 18 in which the second memory means is arranged to be reset by an enable signal for allowing the responder to respond to the same or a subsequent interrogation signal after the responder has ceased signal transmission.

20. A responder according to claim 18 in which the second memory means comprises a register responsive to disable signals and a memory module responsive both to the register and to the signal ceasing means for allowing the responder to complete the transmission of an identification signal prior to being disabled.

21. A responder according to claim 16 which further includes a Manchester encoder for deriving encoded identification data from the identification data and the oscillator, for receipt at the modulator, and the transmitter and receiver comprise an antenna coupled to an RF module for performing backscatter modulation in response to an interrogation signal, the Manchester encoder being responsive to an output enable signal signifying completion of the transmission of the identification signal.

22. An interrogator for an identification system of the type comprising an interrogator and a plurality of object based responders, the interrogator including transmitter means for transmitting an interrogation signal to the responders, receiver means for receiving identification signals from the responders in response to the interrogation signal, first processor means for substantially contemporaneously determining the individual and correct receipt of an identification signal, signal generator means responsive to the first processor means for generating substantially contemporaneously an interrupt signal in the event of any identification signal not being individually and correctly received from any one or more responders, and for causing the interrupt signal to be transmitted sufficiently quickly to suspend signal transmission from any such responder whilst it was not individually and correctly transmitting its identification signal.

23. An interrogator according to claim 22 in which the first processor means is arranged to continue receiving and processing all identification signals, and the signal generator means is arranged to continue generating interrupt signals, until no further identification signal is individually and correctly received, for a time period sufficient to ensure that all identification signals from objects have been individually and correctly received.

24. An interrogator according to claim 22 in which the transmitter is arranged in an alternative mode of operation to transmit the interrogation signal continuously, and the signal generator means is arranged to transmit the interrupt signal at a time period which defaults to less than the average receipt time of a valid identification signal in the absence of the receipt of an identification signal at the interrogator.

25. An interrogator according to claim 22 in which the signal generator means is arranged to generate enable and disable signals for transmission via the transmitter, the disable signal being arranged to set memory elements in the objects preventing them, only once they have ceased signal transmission, from responding to any subsequent interrogation signal for a minimum predetermined standoff time period, and the enable signal being arranged to reset the memory elements to allow the objects to respond to a subsequent interrogation signal.

26. An interrogator according to claim 22 in which the receiver includes a receiving antenna and a quadrature receiver, the first processor means includes a signal processor for processing baseband components of the identification signal derived from the quadrature receiver into a reconstructed Manchester data signal, and an error checking microprocessor for decoding and error checking the Manchester signal at least on the basis of duty cycle, clock rate, data stream length and checksum calculation.

* * * * *